(12) United States Patent
Vetrovec et al.

(10) Patent No.: US 7,058,100 B2
(45) Date of Patent: Jun. 6, 2006

(54) SYSTEMS AND METHODS FOR THERMAL MANAGEMENT OF DIODE-PUMPED SOLID-STATE LASERS

(75) Inventors: Jan Vetrovec, Thousand Oaks, CA (US); Robert R. Rice, Simi Valley, CA (US)

(73) Assignee: The Boeing Company, Seattle, WA (US)

( * ) Notice: Subject to any disclaimer, the term of this patent is extended or adjusted under 35 U.S.C. 154(b) by 413 days.

(21) Appl. No.: 10/124,911

(22) Filed: Apr. 18, 2002

(65) Prior Publication Data

US 2003/0198264 A1 Oct. 23, 2003

(51) Int. Cl.
*H01S 3/04* (2006.01)
(52) U.S. Cl. .............. 372/34; 372/35; 372/36; 372/43.01; 372/69
(58) Field of Classification Search ............ 372/34–36, 372/43–50, 69–79
See application file for complete search history.

(56) References Cited

U.S. PATENT DOCUMENTS

| 4,150,341 A |   | 4/1979 | Ferguson |
|---|---|---|---|
| 4,210,389 A |   | 7/1980 | Burkhart et al. |
| 5,031,690 A | * | 7/1991 | Anderson et al. ............ 165/43 |
| 5,137,079 A |   | 8/1992 | Anderson |
| 5,151,909 A | * | 9/1992 | Davenport et al. ........... 372/22 |
| 5,235,251 A | * | 8/1993 | Schlie ........................ 315/112 |
| 5,249,189 A | * | 9/1993 | Scheps ........................ 372/20 |
| 5,307,365 A |   | 4/1994 | Stappaerts et al. |
| 5,311,528 A |   | 5/1994 | Fujino |
| 5,317,579 A |   | 5/1994 | Adsett |
| 5,327,442 A |   | 7/1994 | Yarborough et al. |
| 5,327,444 A | * | 7/1994 | Mooradian ................... 372/44 |

(Continued)

FOREIGN PATENT DOCUMENTS

EP 0798826 A2 10/1997

(Continued)

OTHER PUBLICATIONS

*Module 3-4 CW Nd: YAG Laser Systems*; pp. 1-17; available at <http://cord.org/cm/leot/course03_mod04/mod03_04.htm> (visited Nov. 29, 2001).

(Continued)

*Primary Examiner*—Min Sun Harvey
*Assistant Examiner*—Delma R. Flores Ruiz
(74) *Attorney, Agent, or Firm*—Alston & Bird LLP

(57) ABSTRACT

A solid-state laser system includes a solid-state laser having a laser gain medium and at least one pumping diode. The system also includes a thermal management system capable of placing a coolant in thermal communication with the solid-state laser such that the coolant can carry heat away from the solid-state laser. The thermal management system is then capable of rejecting the heat carried away by the coolant to a fluid at an ambient temperature, where the coolant can be at a temperature between 40° C. and 80° C. when the thermal management system rejects the heat. Advantageously, the thermal management system of the present invention can include reject the heat to a fluid comprising, for example, air or water. As such, the thermal management system does not require separate cooling of the fluid carrying the heat away from the coolant.

24 Claims, 6 Drawing Sheets

U.S. PATENT DOCUMENTS

| | | | |
|---|---|---|---|
| 5,369,660 A * | 11/1994 | Schlie et al. .................. | 372/55 |
| 5,375,132 A | 12/1994 | Connors et al. | |
| 5,491,982 A * | 2/1996 | Gowens ....................... | 62/434 |
| 5,749,243 A * | 5/1998 | Lester ......................... | 62/434 |
| 5,848,081 A * | 12/1998 | Reed et al. ................... | 372/35 |
| 5,970,729 A | 10/1999 | Yamamoto et al. | |
| 5,976,123 A * | 11/1999 | Baumgardner et al. ....... | 606/13 |
| 5,978,407 A | 11/1999 | Chang et al. | |
| 6,195,372 B1 | 2/2001 | Brown | |
| 6,665,328 B1 * | 12/2003 | Henrie et al. ................. | 372/69 |
| 6,845,110 B1 * | 1/2005 | Gibson ........................ | 372/35 |

FOREIGN PATENT DOCUMENTS

| | | |
|---|---|---|
| JP | 05327072 | 12/1993 |
| JP | 11163569 | 6/1999 |
| JP | 2000082860 | 3/2000 |

OTHER PUBLICATIONS

A. C. Erlandson, G. F. Albrecht, S. E. Stokowski; *Model Predicting the Temperature Dependence of the Gain Coefficient and the Extractable Stored Energy Density in Nd: Phosphate Glass Lasers*; 9 J. Opt. Soc. Am. B.; pp. 214-222; 1992.

Walter Koechner; Solid-State Laser Engineering; Chapter 6.1, section 1, *Pump Sources: Laser Diode*; pp. 312-332; 5$^{th}$ Ed. 1999; Springer.

Walter Koechner; Solid-State Laser Engineering; Chaper 6.3, section 3, *Pump Cavities and Coupling Optics: Mechanical Design*; pp. 392-405; 5$^{th}$ Ed. 1999; Springer.

*Refrigeration* (& *Heat Pumps*); pp. 1-16; available at <http://www.tech.plym.ac.uk./sme/ther201/thermol/refrig.pdf> (visited Apr. 18, 2002).

* cited by examiner

SYSTEMS AND METHODS FOR THERMAL MANAGEMENT OF DIODE-PUMPED SOLID-STATE LASERS

FIELD OF THE INVENTION

The present invention generally relates to solid-state lasers and, more particularly, to thermal management of solid-state lasers.

BACKGROUND OF THE INVENTION

High-average power (HAP) solid-state lasers (SSL) are finding increasingly important utility in defense and commercial applications. Because a laser gain medium must be excited by an outside source of energy before it will emit electromagnetic radiation, SSLs generally comprise a laser gain medium and a source of optical energy. This source of energy provides visible or near visible optical pump radiation into the laser gain medium, which converts it into a laser beam. In this regard, most of the recent growth in the SSL industry can be attributed to introduction of laser diodes as the source of energy because diodes are generally very efficient in converting electric energy into the pump light and usually deposit only a limited amount of waste heat into the laser gain medium. Generally, diode-pumped SSLs are advantageous over the more conventional gas lasers because diode-pumped SSLs operate at wavelengths compatible with optical fibers, have complete electric operation, a short wavelength, a continuous duty and high efficiency. Additionally, diode-pumped SSLs allow engineering a high-power device into a small, lightweight package.

Many emerging military and industrial applications for HAP SSL require integration of laser systems on mobile platforms, such as vehicles, watercraft, spacecraft and aircraft. For example, military applications for mobile HAP SSLs can include defense against tactical and strategic missiles. Also, mobile HAP SSLs can address emerging industrial applications, such as dismantlement of nuclear facilities, drilling of oil wells and road tunnels, and spacecraft orbit transfer.

As previously indicated, SSLs operate on electricity. Despite the recent introduction of pumping SSLs by highly efficient semiconductor diodes, the operation of SSLs still produces a significant amount of waste heat that must be rejected. Typically, for each joule of laser energy produced, three to four joules of heat must be removed from a SSL system and rejected to the environment. In conventional SSL systems, the SSL pump diodes and laser gain medium are operated at ambient and sub-ambient temperatures, which increases the electric efficiency of the SSL system and extends the life of the pump diodes. To reject heat to the environment at the same or higher temperature typically requires the use of refrigeration to "pump" the heat from laser components to the environment at a higher temperature. In this regard, FIG. 1 illustrates a simplified diagram of a closed loop refrigeration system 5 commonly used in SSL systems. A variety of cooling systems of this type are commercially available and currently used in many applications. However, closed cycle refrigeration type systems are usually very bulky and heavy in comparison to the SSL they support. While this is not of particular concern in fixed laser installations (e.g., factory use), a closed-cycle refrigeration is entirely unsuitable for large (multi-kilowatt) SSLs operated on mobile platforms where size and weight are paramount. In addition, closed cycle refrigeration systems are expensive and require large amount of electric power to operate (typically 20–30% of the SSL system electric power budget).

Referring to FIG. 2, another conventional refrigerator system 7 used with SSL uses open-cycle with subcritical refrigerant storage. Such refrigerants must be sufficiently safe for release into the environment, hence the choice is limited to liquid carbon dioxide and liquid nitrogen. These cryorefrigerants are stored in dewars (typically cooled by the gradual boil-off of stored cryogen) and are normally used in conjunction with a heat exchanger and secondary coolant loop. The resulting system is complex, heavy, and requires frequent user's attention. Furthermore, expendable cryorefrigerant must be periodically replenished, which requires significant logistics support in the field. Requirement for such logistics support may be a barrier to many important military and commercial uses.

SUMMARY OF THE INVENTION

In light of the foregoing background, the present invention provides improved systems and methods for thermal management of a SSL. The systems and methods of the present invention provide a simple, rugged, efficient, inexpensive, compact, and lightweight SSL thermal management system, when compared to conventional thermal management systems. According to aspect of the present invention, a solid-state laser system includes a solid-state laser having a laser gain medium, such as Nd:YAG, Nd:GGG, Nd:GSGG or Nd:Glass, and at least one pumping diode. The system also includes a thermal management system capable of placing a coolant in thermal communication with the solid-state laser such that the coolant can carry heat away from the solid-state laser. The thermal management system is then capable of rejecting the heat carried away by the coolant to a fluid at an ambient temperature, where the coolant can be at a temperature between 40° C. and 80° C. when the thermal management system rejects the heat. Advantageously, the thermal management system of the present invention can include reject the heat to a fluid comprising, for example, air or water. As such, the thermal management system does not require separate cooling of the fluid carrying the heat away from the coolant.

Before operating the solid-state laser, the thermal management system can be capable of heating the coolant to at least one operating temperature. In this regard, the thermal management system retains the heat carried away by the coolant without rejecting the heat to the fluid while the thermal management system heats the coolant. The thermal management system can also be capable of storing the coolant. As such, the thermal management system can vaporize at least a portion of the coolant to thereby reject the heat carried away by the coolant. Then, the thermal management system can remove the vaporized portion of the coolant from the thermal management system.

According to another aspect of the present invention, a thermal management system for maintaining an operating solid-state laser to at least one predetermined temperature includes at least one pump and at least one heat exchanger. The pumps are capable of placing a coolant in thermal communication with the solid-state laser such that the coolant can carry heat away from the solid-state laser. The heat exchangers, in turn, are capable of rejecting the heat carried away by the coolant to a fluid at an ambient temperature. The thermal management system can also include at least one heater capable of heating the coolant to at least one operating temperature before operating the solid-state laser. In this embodiment, the thermal management system can also include a plurality of valves capable of directing the coolant such that the heat exchangers retain the heat carried away by the coolant without rejecting the heat to the fluid while the heaters heat the coolant.

The thermal management system can define a plurality of closed loops. In this regard, each closed loop comprises at least one pump and at least one heat exchanger. And each closed loop is capable of maintaining at least one of the laser gain medium and pumping diodes at a respective predetermined temperature. For example, the thermal management system can define first and second closed loops, where the first closed loop is capable of maintaining the laser gain medium of the solid-state laser at a first predetermined temperature. The second closed loop, in turn, is capable of maintaining the pumping diodes at a second predetermined temperature.

According to one embodiment, the thermal management system includes a reservoir, at least one pump and an evaporator. The reservoir is capable of storing a coolant, while the pumps are capable of pumping the coolant from the reservoir into thermal communication with the solid-state laser such that the coolant can carry heat away from the solid-state laser. The evaporator, in turn, is capable of vaporizing at least a portion of the coolant to thereby reject the heat carried away by the coolant. The thermal management system of this embodiment can also include an exhaust element, such as a blower or a sorption medium, capable of removing the vaporized portion of the coolant from the evaporator.

BRIEF DESCRIPTION OF THE DRAWINGS

Figure 1:
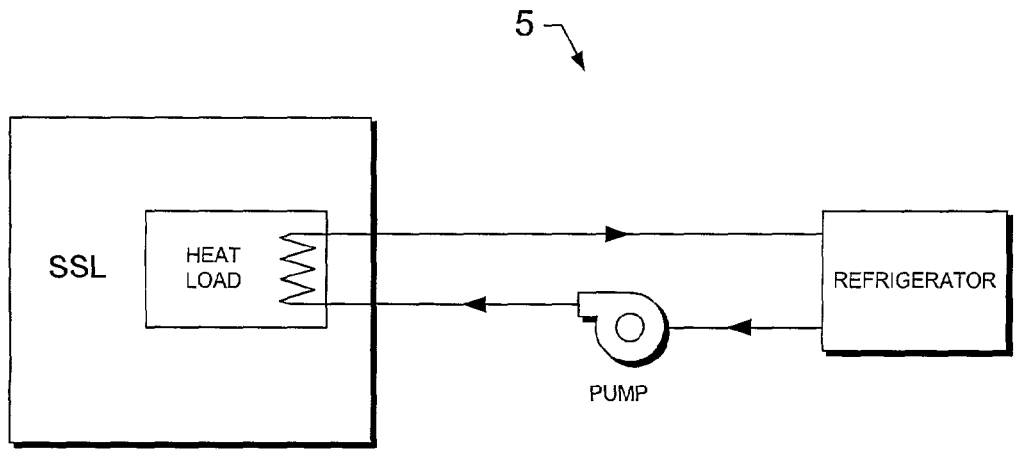
Figure 2:
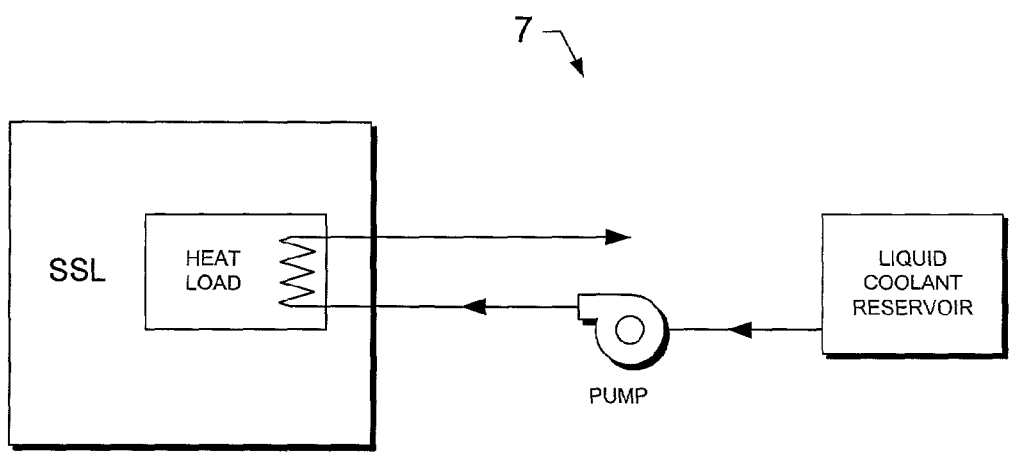
Figure 3:
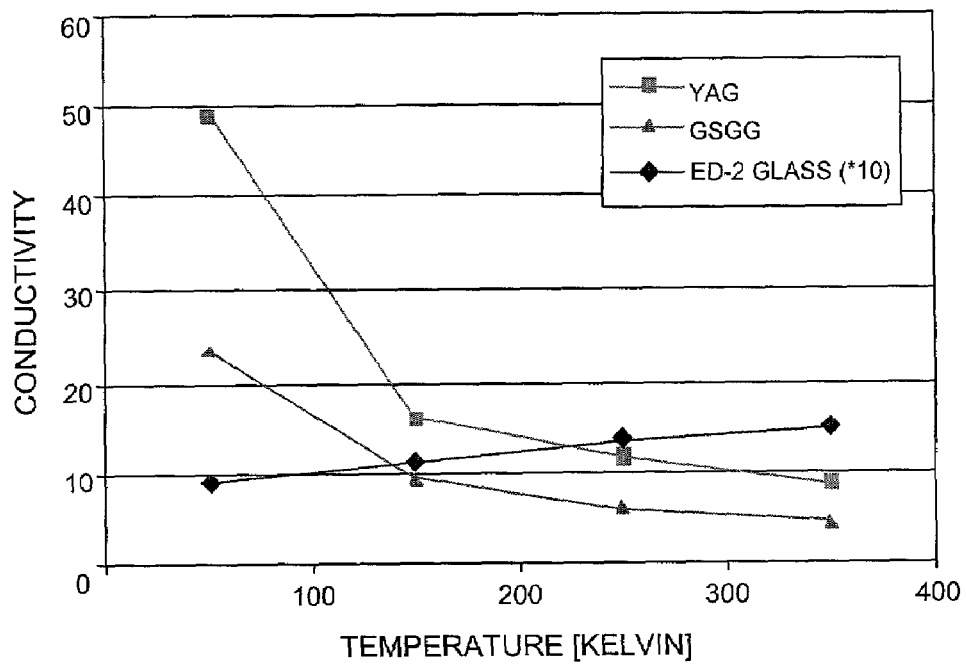
Figure 4:
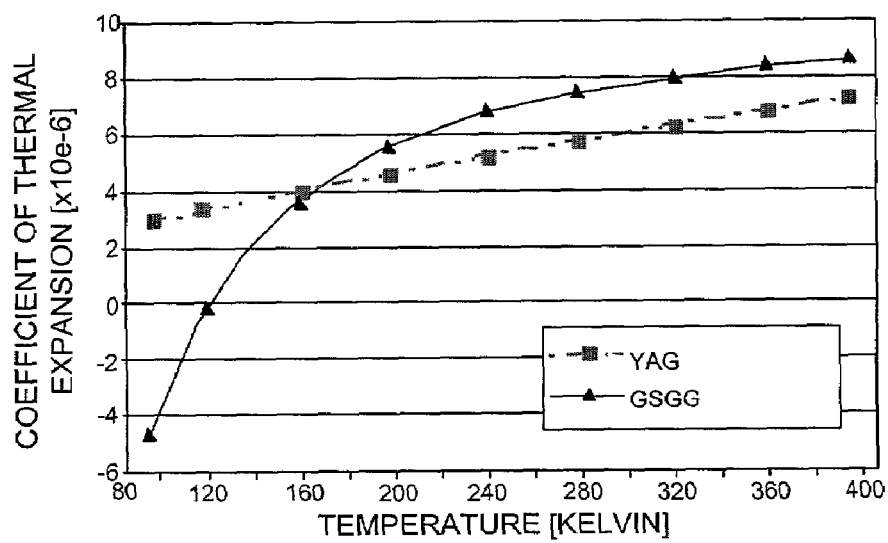
Figure 5:
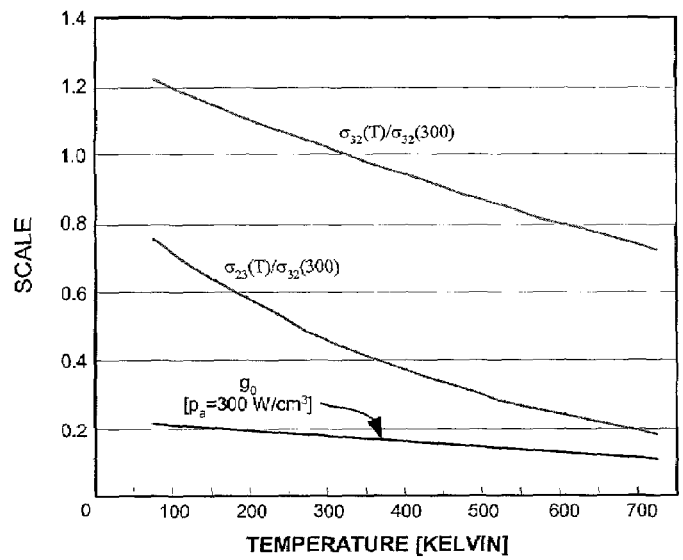
Figure 6:
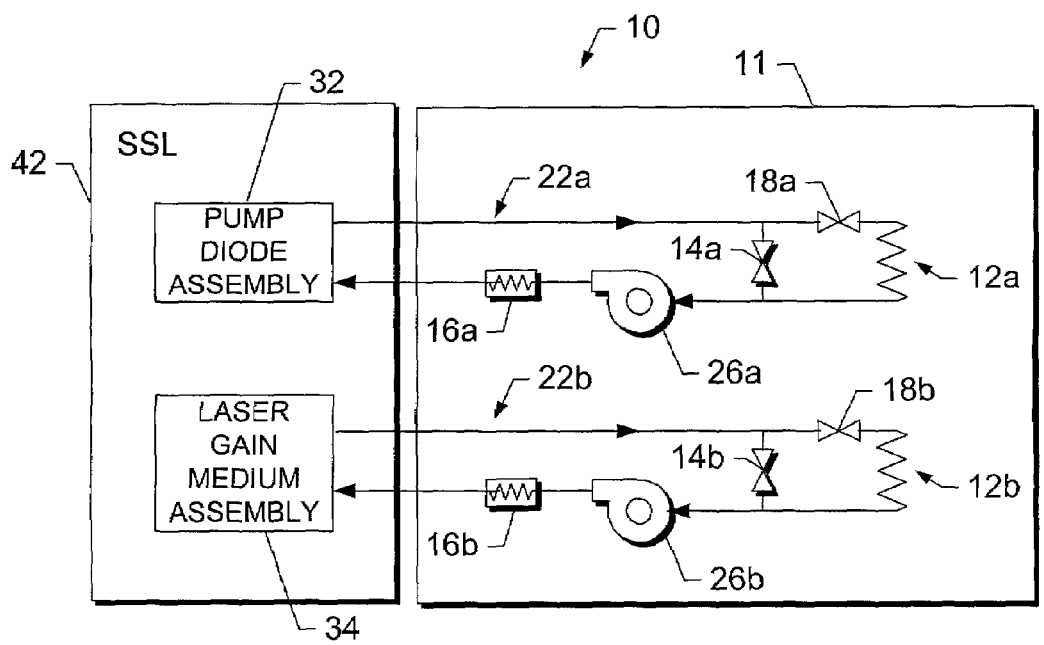
Figure 7:
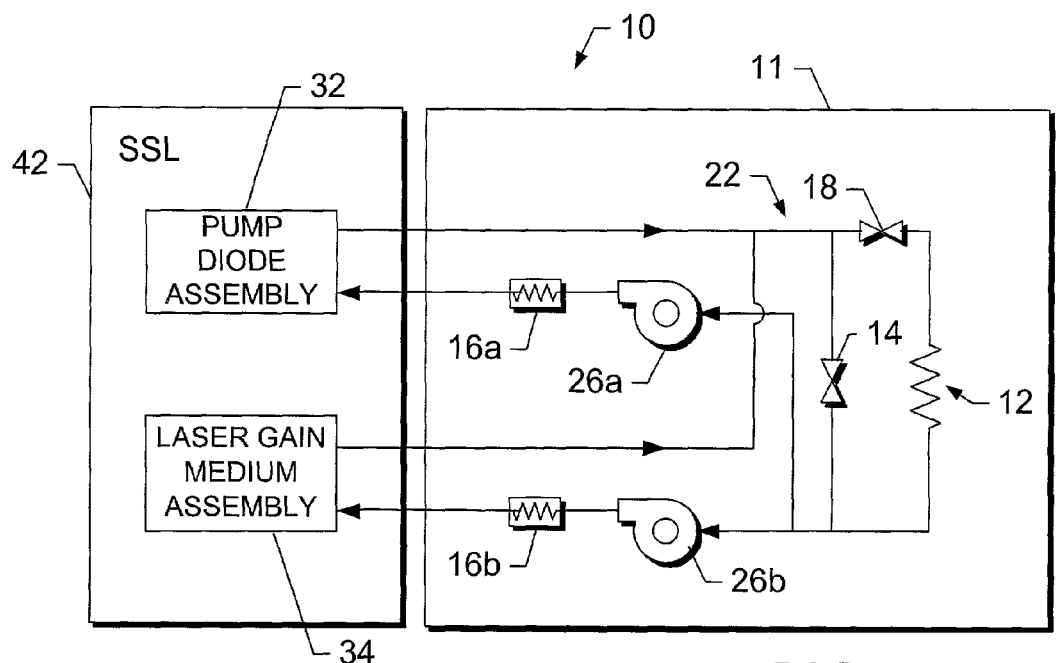
Figure 8:
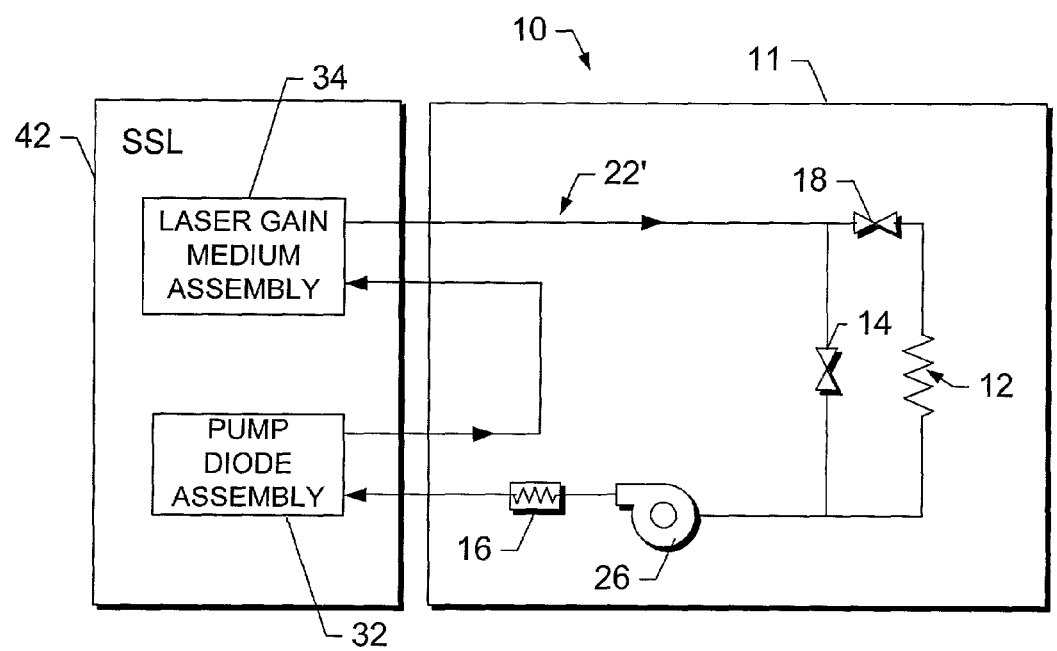
Figure 9:
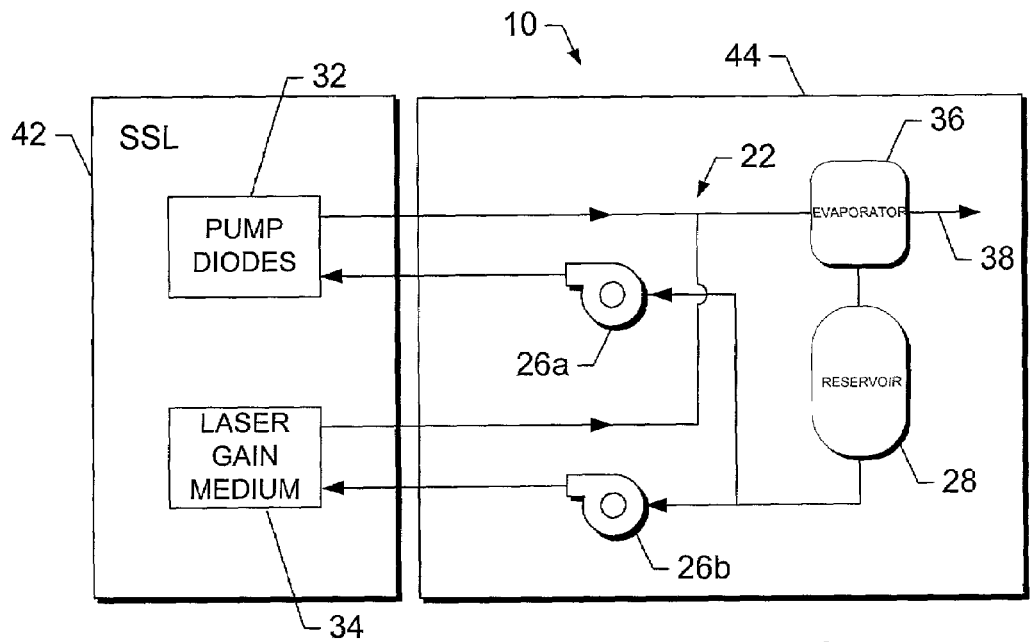
Figure 10:
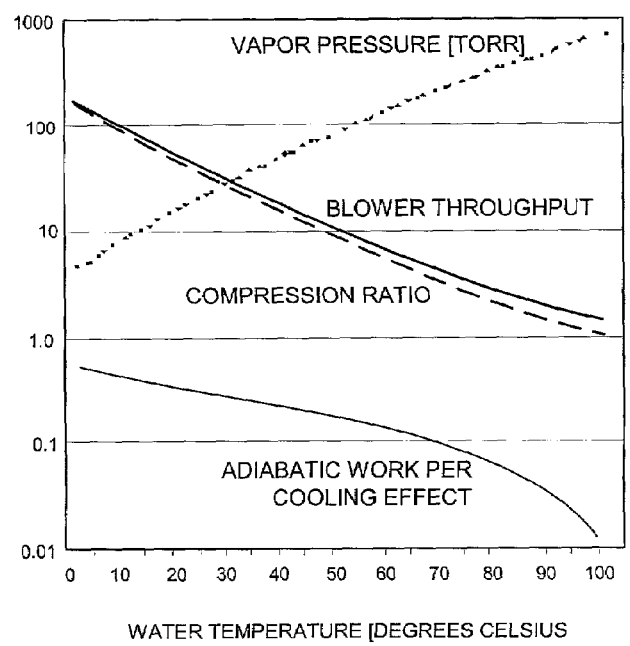
Figure 11:
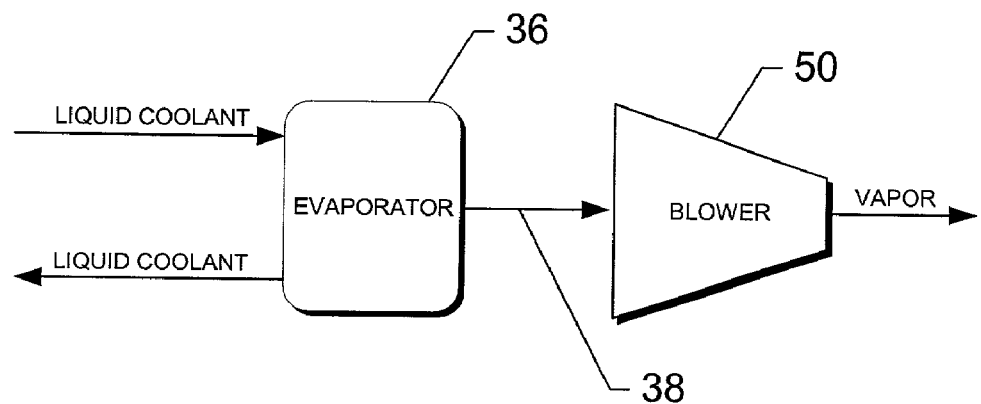
Figure 12:
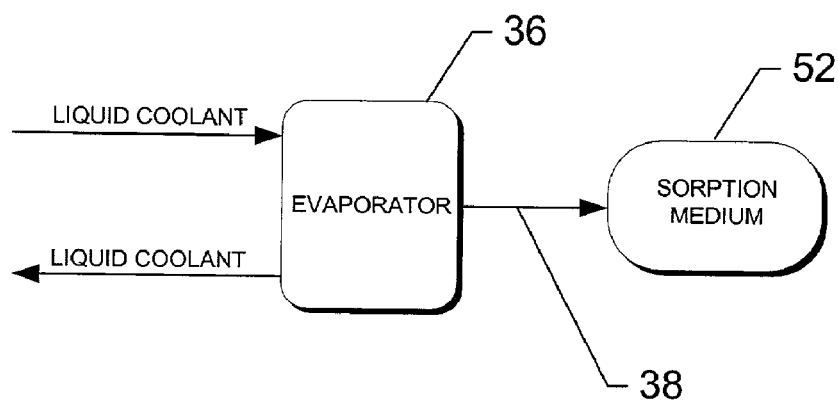

Having thus described the invention in general terms, reference will now be made to the accompanying drawings, which are not necessarily drawn to scale, and wherein:

FIG. 1 is a schematic block diagram of a conventional closed-loop refrigeration system used in SSL systems;

FIG. 2 is a schematic block diagram of a conventional open-loop refrigeration systems used in SSL systems;

FIG. 3 is a chart illustrating the thermal conductivity of several commonly used laser gain mediums;

FIG. 4 is a chart illustrating the thermal expansion coefficient of several commonly used laser gain mediums;

FIG. 5 is a chart illustrating the relative cross-sections $\sigma_{23}$ and $\sigma_{32}$, and small signal gain $g_0$ of $Nd^{3+}$ doped into LHG-5 glass;

FIG. 6 is a schematic block diagram illustrating a thermal management system according to one embodiment of the present invention;

FIG. 7 is a schematic diagram illustrating a variation of the thermal management system illustrated in FIG. 6 in accordance with one embodiment of the present invention;

FIG. 8 is a schematic diagram illustrating another variation of the thermal management system illustrated in FIG. 6 in accordance with one embodiment of the present invention;

FIG. 9 is a schematic block diagram illustrating a thermal management system in according to another embodiment of the present invention;

FIG. 10 is a chart illustrating the temperature dependence of the vapor pressure of water, and compression ratio, blower throughput and adiabatic work required if the water vapor is removed continuously removed from the evaporator illustrated in FIG. 9 and exhausted to the atmosphere at 760 Torr;

FIG. 11 is a schematic block diagram illustrating one arrangement of a blower for removing low pressure vapor from the evaporator according to one embodiment of the present invention; and FIG. 12 is a schematic block diagram illustrating another arrangement for removing low pressure vapor from evaporator according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As indicated in above, diode-pumped SSLs generally comprise a laser gain medium and at least one pump diode. It is well known that operation of an SSL at elevated temperatures generally leads to some degradation in performance of the laser gain medium due to the effects of the elevated temperature on the host medium and dopant ions that make up the laser gain medium. Among the affected parameters are thermomechanical properties of the host medium and laser gain produced by the dopant ions. As seen in FIG. 3, for example, the thermal conductivity of commonly used host media Yitrium Aluminum Garnett (YAG) and Gadolinium Scandium Gallium Garnet (GSGG) crystals decreases with temperature. As shown, most of the drop in thermal conductivity occurs at temperatures below 300 Kelvin (K), while the thermal conductivity decreases rather gradually as the temperature rises above 300K. In contrast, glass host media (e.g., ED-2 glass silicate) actually experience a slight increase in thermal conductivity, as also shown.

As shown in FIG. 4, in addition to the decrease in thermal conductivity, crystal host media such as YAG and GSGG also exhibit an increase in their coefficient of thermal expansion at higher temperatures, although such increases are minor as the temperature increases above 300K. Generally, elevated temperatures result in increased thermal population of dopant atoms in the terminal laser level which, in turn, reduces laser gain. In addition, effective cross-sections of the dopant for absorption and emission can also be affected by temperature. It should be noted, however, that some dopants are more sensitive to temperature than others. For example, a $Yb^{3+}$ dopant ion is very sensitive to even small temperature changes above 300K. In contrast, performance of a $Nd^{3+}$ dopant ion has a low sensitivity to temperature changes in the 300–400 K range. In this regard, FIG. 5 illustrates the lower level absorption cross-section $\sigma_{23}$ and stimulated emission cross-section $\sigma_{32}$, along with the signal gain ($g_0$) of $Nd^{3+}$ doped LHG-5 glass. And as shown in the temperature range of 300–400 K, gain variation with changes in temperature is generally small. For more information on the effect of temperature on such doped crystal host media, see A. C. Erlandson et al., *Model Predicting the Temperature Dependence of the Gain Coefficient and the Extractable Stored Energy Density in Nd:Phosphate Glass Lasers*, 9 J. OPT. SOC. AM. B. 214–222 (1992), the contents of which are hereby incorporated by reference in its entirety.

In the last five years, the power, lifetime, reliability and cost of diode lasers suitable for SSL pumping have gradually made their use more practical. For example, in recent years the cost of diodes has gone from well over $100/Watt to approximately $20/Watt, and is expected to further decrease to $1/Watt or lower over the next decade. Also, the lifetime of laser diodes had increased from less than 5,000 hours to over 20,000 hours. In this regard, it is well known that the lifetime of laser diodes is greatly affected by operating temperature. In particular, it has been estimated that operating diodes above the 30° C. nominal operating temperature reduces lifetime by a factor of two for every 10° C. temperature increase. Thus, consider a laser diode that has a lifetime of 20,000 hours at the nominal 30° C. operating temperature of. At an operating temperature of 40° C., the life time of the laser diode would decrease to 10,000 hours, and as the temperature increased to 50° C. the lifetime would decrease to 5,000 hours, and so on. As a result of the previous high cost and short lifetime of laser diodes, conventional SSLs generally operate pump diodes at approximately 20° C. to avoid frequent replacement of the costly pump diodes.

In addition to the effects of temperature on the lifetime of laser diodes, the electro-optic efficiency of diodes is temperature sensitive, with the efficiency slightly decreasing with increasing temperature. Further, wavelength radiation output by the laser diodes is also temperature sensitive. In this regard, increasing the temperature of laser diodes increases the wavelength of the radiation output by the laser diodes by approximately 0.3 nm/° C. The effects of temperature on the wavelength output by the laser diodes can be obviated, however, because laser diodes can be engineered to generate output at specific wavelength for operation at a particular temperature.

Considering the decrease in the cost and increase in the lifetime of modern laser diodes, reference is now drawn to FIG. 6, which illustrates a SSL system 10 in accordance with one embodiment of the present invention. As shown, the SSL system includes a solid-state laser 42 and a thermal management system 11. The solid-state laser 42 comprises at least one pump diode and at least one laser gain medium, each of which can comprise any one of a number of different devices, as such are known. For example, the pump diodes can be arranged as a pump diode assembly including semiconductor pump diodes and other typical components, such as a heat exchanger and a mount. Such pump diode assemblies are generally known as "diode bars," "diode arrays" or "diode stacks." For more information on such diode assemblies, see Walter Koechner, SOLID STATE LASER ENGINEERING, Chapter 6.1, section 1, *Pump Sources: Laser Diodes* (5th ed. 1999), the contents of which are hereby incorporated by reference in its entirety. As used hereinafter, the one or more pump diodes of the solid-state laser will be referred to as a pump diode assembly 32. It should be understood, however, that the pump diode assembly includes any suitable arrangement of one or more pump diodes, including arrangements where the pump diodes are arranged in an assembly including other components. The laser gain medium preferably comprises a laser gain medium that is relatively insensitive to temperature changes in the range 50 to 100 degrees Centigrade, such as Nd:YAG, Nd:GGG, Nd:GSGG and Nd:Glass. Similar to the pump diodes, the laser gain medium can also comprise a laser gain medium assembly including the laser gain medium arranged with other components, such as a heat exchanger and coolant flow paths, on a mount. For more information on such laser gain medium assemblies, see Walter Koechner, SOLID STATE LASER ENGINEERING, Chapter 6.3, section 3, *Pump Cavities and Coupling Optics: Mechanical Design* (5th ed. 1999), the contents of which are hereby incorporated by reference in its entirety. In this regard, as used hereinafter the laser gain medium will be referred to as a laser gain medium assembly 34. But it should be understood that laser gain medium assembly an include any suitable arrangement of one or more laser gain mediums, including arrangements where the laser gain medium is arranged on a mount and includes other components.

As is apparent, the thermal management system 11 is a closed-loop system and, as such, the illustrated system is particularly suitable for very long, continuous operation. The thermal management system generally comprises two closed-loops, with each comprising a heat exchanger 12a, 12b, a heater 16a, 16b, a pump 26a, 26b, such as a fluid pump, and plurality of transfer lines forming closed flow loops 22a, 22b. In addition, the system can incorporate valves 14a, 14b, 18a and 18b that allow coolant to pass heat exchangers 12a and 12b, respectively. It can be easily recognized by those skilled in the art that the thermal management system may further incorporate valves, reservoirs, demineralizers, accumulators, sensors and other flow loop control and instrumentation devices as may be required to maintain temperature, flow rate, and pressure of the coolant in each loop within prescribed limits.

During normal operation of flow loop 22a, valve 18a is open and valve 14a is closed, while pump 26a is capable of circulating a coolant from heat exchanger 12a through the pump diode assembly 32 of solid-state laser 42, and back through heat exchanger 12a. Similarly, during normal operation of flow loop 22b, valve 18b is open and valve 14b is closed, while pump 26b is capable of circulating a coolant from heat exchanger 12b through the laser gain medium assembly 34 of solid-state laser 42, and back through heat exchanger 12b. The coolant can be any of a number of different liquid or gas coolants, but preferred coolants include deionized water, alcohol and a mixture of water and alcohol, with the alcohol preferably selected from members of the lower alcohol family. Also, the flow loops can be arranged in any one of a number of manners to circulate coolant through the pump diode assembly and laser gain medium assembly to thereby directly or indirectly cool the pump diode assembly and laser gain medium assembly, respectively. For an example of one arrangement whereby the flow loops can be arranged respective the pump diode assembly and laser gain medium assembly, see U.S. Pat. No. 5,327,442 entitled: *Solid State Laser with Dual Cooling Loops*, issued Jul. 5, 1994 to Yarborough et al. or U.S. Pat. No. 5,978,407 entitled: *Compact and Highly Efficient Laser Pump Cavity*, issued Nov. 2, 1999 to Chang et al., the contents of both of which are hereby incorporated by reference in its entirety.

In operation, the solid-state laser 42 produces heat in the pump diode assembly 32 and laser gain medium assembly 34. Heat generated in the pump diode assembly 32 is carried away from the pump diode assembly 32 to heat exchanger 12a by the coolant circulating in loop 22a. In similar fashion, heat generated in the laser gain medium assembly 34 is carried away from the laser gain medium assembly 34 to the heat exchanger 12b by the coolant circulating in loop 22b. The thermal management system 11 preferably delivers coolant to the pump diode assembly 32 and the laser gain medium assembly 34 each at a predetermined temperature that can be maintained within a narrow range of typically few degrees Centigrade to provide more exact thermal management of the SSL 42.

Within each loop, coolant is fed into heat exchangers 12a and 12b, respectively, at temperatures sufficiently high so that the heat exchangers can reject heat the heat into a fluid, such as air or water, at ambient temperature. In this regard, the fluid is at ambient temperature when the temperature of the fluid equals the temperature of the medium surrounding the fluid (e.g., air). When the fluid comprises air, a mist of a liquid can be injected onto the surface of the heat exchanger to enhance the heat transfer coefficient on the air side of the exchangers which, in turn, allows rapid removal of heat from the heat exchangers. The temperature range of coolant entering heat exchangers 12a and 12b is preferably between 40° C. and 80° C. which, advantageously, makes it possible to cool heat exchangers 12a and 12b with fluids such as air or water at ambient temperature. In this regard, separate cooling of the fluid rejecting the heat is not required.

As is apparent, the coolant carrying heat away from the pump diode assembly 32 is preferably above the nominal 20° C. of typical pump diodes. And whereas some sacrifice in the lifetime of the pump diodes of the pump diode assembly 32 will occur, the high lifetime of modern pump diodes allows for some sacrifice in the lifetime so that the heat can be rejected into the fluid at ambient temperature. In this regard, many applications, such as various military applications, can operate with pump diodes having a lifetime of 1,000 hours or less. Using the above, then, such diodes normally rated at a lifetime of 20,000 hours at 30° C. can be operated at 70° C. and still meet a 1,000 hour lifetime requirement of a given application.

Prior to starting laser operation, the coolant in both loops 22a and 22b of the thermal management system 11 is preferably warmed up from an in-operational temperature (e.g., ambient temperature) to an operational temperature of the respective loop. As such, heaters 16a and 16b, which are preferably electrically operated, can serve to warm the coolant in each respective loop. Also, during normal operation, heaters 16a and 16b can make minor temperature adjustments to the coolant in their respective loops. With respect to loop 22a, the coolant can be warmed by closing valve 18a and opening valve 14a, while pump 26a re-circulates the coolant through heater 16a, thereby warming the coolant to a normal operating temperature. As the coolant warms, valve 18a is gradually opened to allow the heat exchanger 12a to warm up. And when the coolant reaches the operational temperature, valve 14a is closed shut. Similar to the coolant in loop 22a, the coolant in loop 22b can also be warmed, typically in a fashion similar to that of loop 22a.

It will be appreciated that the thermal management system 11 of the SSL system 10 illustrated in FIG. 6 can be implemented in a number of variants without departing from the spirit and scope of the present invention. For example, FIG. 7 illustrates thermal management system 11 having a single flow loop 22 with two separate branches servicing the pump diode assembly 32 and the laser gain medium assembly 34, respectively. Also, FIG. 8 illustrates a further variant of the thermal management system 11 of FIG. 6. As shown in FIG. 8, thermal management system 11 includes a single loop 22' flowing coolant through the pump diode assembly 32 and laser gain medium 34 in series. As shown, the laser gain medium assembly 34 is positioned down stream of the pump diode assembly 32 in that the coolant enters the laser gain medium assembly 34 after exiting the pump diode assembly 32. In this regard, the pump diode assembly 32 receive coolant at a more precise temperature that can be controlled by the heater 16. In contrast, the laser gain medium assembly 34 is less sensitive to temperature variations and, thus, can receive the coolant at a less precise temperature after the coolant has cooled the pump diode assembly 32.

Referring now to FIG. 9, there is shown a thermal management system 44 in accordance with another embodiment of the present invention. Thermal management system 44 of this embodiment generally comprises a reservoir 28, at least one pump (e.g., fluid pump) 26a and 26b, an evaporator 36 and plurality of transfer lines forming a flow loop 22. As before, it can be easily recognized by those skilled in the art that thermal management system 44 may further incorporate valves, reservoirs, accumulators, sensors, and other flow loop control and instrumentation devices as may be required to maintain temperature, flow rate, and pressure of the coolant in each loop within prescribed limits. It should also be understood that whereas the illustrated embodiment depicts the evaporator located within the thermal management system, the evaporator can be located in the pump diode assembly 32 or the laser gain medium assembly 34 without departing from the spirit and scope of the present invention. Alternatively, an evaporator can be located in each of the pump diode assembly and the laser gain medium assembly 34.

During normal operation, pump 26a draws liquid coolant from reservoir 28 and feeds the coolant through the pump diode assembly 32 into evaporator 36. The coolant can comprise any number of different coolants but, in a preferred embodiment, the coolant comprises a liquid having a high vapor pressure at ambient temperature. For example, the coolant preferably comprises liquids such as deionized water, alcohol, and a mixture of water or suitable member of the lower alcohol family. While inside the evaporator 36, the coolant is exposed to partial vacuum and at least a portion of the coolant is vaporized. Preferably, the coolant is fed into evaporator 36 at a temperature sufficiently high to permit rapid evaporation rates at only rough vacuum conditions, such as above 100 Torr. In this regard, if the coolant comprises water, the coolant entering evaporator 36 is preferably at a temperature between 40° C. and 80° C. As shown in FIG. 10, between 40° C. and 80° C., the vapor pressure of water is between 55 to 355 Torr.

In addition, FIG. 10, illustrates how several of the thermal management system parameters vary with temperature. For example, above about 20° C. the partial pressure of water vapor increases dramatically with temperature, eventually reaching 760 Torr at 100° C. Consequently, the compression ratio required to compress water vapor from the evaporator 36 and exhaust it to the atmosphere at 760 Torr drastically declines throughout this temperature range. As a result, adiabatic work of the blower is reduced as the temperature of the coolant increases. FIG. 10 illustrates the adiabatic work (in Joules) of the blower required to produce one Joule of cooling effect. Also shown is the blower throughput (in thousands of CFM) required to generate one megawatt cooling effect.

Whereas the evaporator preferably evaporates at least a portion of the coolant, it should be noted that the pump diode assembly 32 and/or the laser gain medium assembly 34 can additionally or alternatively evaporate at least a portion of the coolant without departing from the spirit and scope of the present invention. It is important to note that the thermal management system controls the coolant temperature by controlling the pressure in the evaporator 36, such as via a variable operating valve disposed into an exhaust line from which the low pressure vapor 38 can exit the evaporator 36.

After a portion of the coolant is vaporized, the low pressure vapor 38 is exhausted from the evaporator 36. The unvaporized portion of the coolant is fed into the reservoir 26, thereby completing a closed loop that began with pump 26a drawing liquid coolant from the reservoir 28. In similar fashion, pump 26b draws liquid coolant from reservoir 28 and feeds it through the laser gain medium assembly 34 into evaporator 36, where at least a portion of the coolant is vaporized while the unvaporized portion is fed into reservoir 28.

During operation of the solid-state laser 42, the pump diode assembly 32 and laser gain medium assembly 34 produce heat. This heat is carried away by the coolant to evaporator 36, which evaporates at least a portion of the coolant. The evaporation, in turn, draws heat from the remaining, liquid portion of the coolant inside the evaporator 36.

To remove the low pressure vapor 38 from the evaporator 36, thermal management system 44 can employ any one of a number of methods, such as by using an exhaust element. For example, referring now to FIG. 11, one method by which the evaporator can remove the low pressure vapor includes the use of a blower 50. Whereas the blower can comprise any one of a number of different known blowers, in preferred embodiments the blower 50 comprises either a Roots blower or a turbo-compressor. When thermal management system 44 is operated intermittently, the blower 50 may be off-loaded through a by-pass line, or by other suitable means known to those skilled in the art.

The blower 50 can include any one of a number of different drives, including gas turbine, electric motor, and flywheel. For short pulse operation of the solid-state laser with typical heat load pulses between 10 and 100 seconds, a combination of electric motor and flywheel drive can be used to smooth out electric power demand of the system. In this regard, mechanical energy stored in the flywheel is used during the laser pulse, with electric power used to restore flywheel energy between laser pulses. The blower 50 can also comprise the turbo-compressor of a gas turbine. In such an instance, air required for combustion is admixed into the low pressure vapor prior to the low pressure vapor entering the turbine compressor. In such an embodiment, the turbo-compressor "sucks" in air for combustion. Such a "suction," then, can provide a vacuum for the evaporator, provided the gas turbine also receives sufficient combustion air. When thermal management system 44 is operated on a platform incorporating a gas turbine for propulsion and/or power generation, the inlet to the compressor of such a turbine can also be adapted to exhaust low pressure vapor 38 from evaporator 36.

Alternate means for removing compressing and exhausting low pressure vapor 38 from evaporator 36 include ejector and a Venturi nozzle. In this regard, the ejector can be driven by high-pressure steam, compressed gas, or products of combustion processes, as such are known. Also, when thermal management system 44 is implemented on a fast flying aircraft, the Venturi nozzle can be operated by ram air. In this regard, a vacuum is created in the Venturi nozzle throat by the high speed air flow.

Referring to FIG. 12, in applications where the release of the low pressure vapor 38 into the environment is undesirable, low pressure in the evaporator can be produced by a sorption medium 52. In this regard, the sorption medium can create a pressure environment lower than that in the evaporator such that the vapor escapes the evaporator into the sorption medium. The sorption medium can comprise any of a number of sorption media, including selected members from the zeolite family (for example, types 4A, 5A, and 13X) and various hygroscopic liquids such as aqueous solution of sodium bromide. When thermal management system 44 is implemented at high altitude, ambient pressure can remove the coolant vapor from evaporator 36.

As an example of the benefits of the SSL system of the present invention over conventional SSL systems, consider a diode-pumped solid-state laser producing 15 kW average power output. Conservatively, such a solid-state laser configuration would require thermal management capable of removing 60 kW of heat, and thereafter rejecting the removed heat to the environment. Assume that the environment is air at a temperature of 32° C. (i.e., 90° F.) and a pressure of 760 Torr. A conventional thermal management system such as that illustrated in FIG. 1 would use a compression-type refrigeration system with a (dry) condenser such as the TRCD-201-2C unit manufactured by Trenton Refrigeration Products of Brantford, Ontario, Canada. The TRCD-201-2C unit weighs 758 kilograms (i.e., 1685 pounds), has a volume of 4.7 m$^3$ and requires 22 kW of electric power (i.e., 20 kW for the compressor and 2 kW for the dry tower fans) to produce the 0° C. evaporator temperature that provides the primary cooling medium to diodes and laser gain medium at 10° C.

In contrast, when the same solid-state laser is operated with thermal management system 11 of the present invention, such as the embodiment illustrated in FIG. 6, providing a return coolant at 60° C., the solid-state laser only requires a dry cooling tower approximately having a volume of 2 m$^3$ and a weight of 100 kilograms (i.e., 222 pounds), and using 2 kW of electric power to drive cooling fans.

Now consider the solid-state laser operated with the thermal management system 44, as illustrated in FIG. 9 providing a water coolant at 70° C. to evaporator. Thermal management system 44 provides the required cooling effect by evaporation of approximately 25 grams of water per second. To exhaust the lower pressure vapor 38, the thermal management system can employ a blower, such as a 300 CFM (cubic feet per minute) Roots blower with a compression ratio at least 3.3 and a drive operated at approximately 9 kW, to exhaust the lower pressure vapor at 70° C. to the ambient pressure of 760 Torr. Such a system weighs approximately 500 pounds (i.e., 400 pound blower/motor plus 100 pound evaporator) plus the weight of the water reservoir (which depends upon the run time of the solid-state laser), and requires a volume of less than 1 m$^3$. And by employing a turbo-compressor driven by an electric motor, the (dry) weight can be further reduced to approximately 250 lbs. Moreover, a gas turbine drive can reduce the weight even further.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A solid-state laser system comprising:
   a solid-state laser including a laser gain medium and at least one pumping diode; and
   a thermal management system capable of placing a coolant in thermal communication with said solid-state laser such that the coolant can carry heat away from said solid-state laser, wherein said thermal management system is capable of rejecting the heat carried away by the coolant to a fluid at an ambient temperature, and wherein the coolant is at a temperature above a nominal operating temperature of said solid-state laser when placed in thermal communication with said solid-state laser.

2. A solid-state laser system comprising:

a solid laser including a laser gain medium and at least one pumping diode; and a thermal management system capable of placing a coolant in thermal communication with said solid-state laser such that the coolant can carry heat away from said solid-state laser, wherein said thermal management system is capable of rejecting the heat carried away by the coolant to a fluid at an ambient temperature, and wherein said thermal management system is capable of heating the coolant to at least one operating temperature before operating the solid-state laser.

3. A solid-state laser system according to claim 2, wherein said thermal management system retains the heat carried away by the coolant without rejecting the heat to the fluid while the thermal management system heats the coolant.

4. A solid-state laser system according to claim 1, wherein the coolant is at a temperature between 40° C. and 80° C. when said thermal management system rejects the heat carried away by the coolant.

5. A solid-state laser system according to claim 1, wherein said thermal management system is capable of storing the coolant, and wherein said thermal management system is capable of vaporizing at least a portion of the coolant to thereby reject the heat carried away by the coolant.

6. A solid-state laser system according to claim 5, wherein said thermal management system is further capable of removing the vaporized portion of the coolant from said thermal management system.

7. A solid-state laser system according to claim 1, wherein the laser gain medium of said solid-state laser comprises is selected from the group consisting of Nd:YAG, Nd:GGG, Nd:GSGG and Nd:Glass.

8. A thermal management system for maintaining an operating solid-state laser to at least one predetermined temperature, wherein the solid-state laser includes a laser gain medium and at least one pumping diode, said system comprising:

at least one pump capable of placing a coolant in thermal communication with the solid-state laser such that the coolant can carry heat away from the solid-state laser; and at least one heat exchanger capable of rejecting the heat carried away by the coolant, wherein said at least one heat exchanger is capable of rejecting the heat to a fluid at an ambient temperature, wherein the coolant has a temperature above a nominal operating temperature of the solid-state laser when placed in thermal communication with the solid-state laser.

9. A thermal management system according to claim 8 further comprising at least one heater capable of heating the coolant to at least one operating temperature before operating the solid-state laser.

10. A thermal management system according to claim 9 further comprising a plurality of valves capable of directing the coolant such that said at least one heat exchanger retains the heat carried away by the coolant without rejecting the heat to the fluid while the at least one heater heats the coolant.

11. A thermal management system according to claim 8, which defines a plurality of closed loops, wherein each closed loop comprises at least one pump and at least one heat exchanger, and wherein each closed loop is capable of maintaining at least one of the laser gain medium and at least one pumping diode at a respective predetermined temperature.

12. A thermal management system according to claim 11, which defines first and second closed loops, wherein the first closed loop is capable of maintaining the laser gain medium of the solid-state laser at a first predetermined temperature, and wherein the second closed loop is capable of maintaining the at least one pumping diode at a second predetermined temperature.

13. A thermal management system according to claim 8, wherein the coolant is at a temperature between 40° C. and 80° C. when said at least one heat exchanger rejects the heat carried away by the coolant.

14. A method of maintaining a solid-state laser at a predetermined temperature, wherein the solid-state laser includes a laser gain medium and at least one pumping diode, said method comprising:

operating the solid-state laser such that the solid-state laser generates heat;

placing a coolant in thermal communication with the solid-state laser;

heating the coolant with the heat generated by the solid-state laser and thereafter carrying the heat away from the solid-state laser; and rejecting the heat carried away by the coolant to a fluid at an ambient temperature, wherein the coolant is at a temperature above a nominal operating temperature of the solid-state laser when placed in thermal communication with the solid-state laser.

15. A method according to claim 14 further comprising heating the coolant to at least one operating temperature before operating the solid-state laser.

16. A method according to claim 14, wherein heating the coolant comprises heating the coolant to a temperature between 40° C. and 80° C.

17. A method according to claim 14, wherein rejecting the heat comprises vaporizing at least a portion of the coolant to thereby reject the heat carried away by the coolant.

18. A method according to claim 17 further comprising removing the vaporized portion of the coolant.

19. A thermal management system for maintaining an operating solid-state laser to at least one predetermined temperature, wherein the solid-state laser includes a laser gain medium and at least one pumping diode, said system comprising:

a reservoir capable of storing a coolant;

at least one pump capable of pumping the coolant from the reservoir into thermal communication with the solid-state laser such that the coolant can carry heat away from the solid-state laser; and an evaporator capable of vaporizing at least a portion of the coolant to thereby reject the heat carried away by the coolant, wherein the coolant is at a temperature above a nominal operating temperature of the solid-state laser when placed in thermal communication with the solid-state laser.

20. A thermal management system according to claim 19 further comprising an exhaust element capable of removing the vaporized portion of the coolant from said evaporator.

21. A thermal management system according to claim 20, wherein said exhaust element comprises a blower.

22. A thermal management system according to claim 20, wherein said exhaust element comprises a sorption medium.

23. A thermal management system according to claim 19, which defines a plurality of closed loops, wherein each closed loop comprises at least one pump, and wherein each closed loop is capable of maintaining at least one of the laser gain medium and at least one pumping diode at the at least one predetermined temperature.

24. A solid-state laser system according to claim 2, wherein the solid-state laser has a nominal operating temperature, and wherein the thermal management system is capable of placing a coolant in thermal communication with said solid-state laser, the coolant being at a temperature above the nominal operating temperature of solid-state laser.

* * * * *

UNITED STATES PATENT AND TRADEMARK OFFICE
CERTIFICATE OF CORRECTION

| | | |
|---|---|---|
| PATENT NO. | : 7,058,100 B2 | Page 1 of 1 |
| APPLICATION NO. | : 10/124911 | |
| DATED | : June 6, 2006 | |
| INVENTOR(S) | : Vetrovec et al. | |

It is certified that error appears in the above-identified patent and that said Letters Patent is hereby corrected as shown below:

Column 11,

Line 9, "solid laser" should read --solid-state laser--.

Column 14,

Line 8, after "of" insert --said--.

Signed and Sealed this

Twenty-eighth Day of November, 2006

JON W. DUDAS
*Director of the United States Patent and Trademark Office*